(12) United States Patent
Bock et al.

(10) Patent No.: US 8,137,780 B2
(45) Date of Patent: Mar. 20, 2012

(54) PLASTIC HOLLOW BODY, IN PARTICULAR PLASTIC PIPE

(75) Inventors: Guntram Bock, Linz (AT); Jürgen Miethlinger, Gampern (AT); Rainer Borth, St. Florian (AT)

(73) Assignee: Knoch, Kern & Co., Klagenfurt (AT)

( * ) Notice: Subject to any disclaimer, the term of this patent is extended or adjusted under 35 U.S.C. 154(b) by 943 days.

(21) Appl. No.: 11/792,177

(22) PCT Filed: Oct. 27, 2005

(86) PCT No.: PCT/EP2005/011500
§ 371 (c)(1),
(2), (4) Date: Apr. 18, 2008

(87) PCT Pub. No.: WO2006/058585
PCT Pub. Date: Jun. 8, 2006

(65) Prior Publication Data
US 2008/0187696 A1 Aug. 7, 2008

(30) Foreign Application Priority Data
Dec. 3, 2004 (AT) ............................... GM 880/2004

(51) Int. Cl.
*B32B 1/08* (2006.01)
*B32B 27/04* (2006.01)
*B32B 27/08* (2006.01)
*B32B 27/12* (2006.01)
*B32B 27/14* (2006.01)
*B32B 27/20* (2006.01)
*B32B 27/26* (2006.01)
*B32B 27/30* (2006.01)
*B32B 27/32* (2006.01)
*B32B 27/34* (2006.01)
*B32B 27/36* (2006.01)
*F16L 9/14* (2006.01)
*F16L 11/04* (2006.01)

(52) U.S. Cl. .................. 428/36.91; 428/34.4; 428/34.5; 428/34.7; 428/35.7; 428/35.9; 428/36.1; 428/36.2; 428/36.4; 428/36.6; 428/36.7; 428/36.8; 138/141; 138/153

(58) Field of Classification Search .............. 428/34.1, 428/34.4, 34.5, 34.7, 35.7, 35.8, 35.9, 36.1, 428/36.2, 36.4, 36.6, 36.7, 36.8, 36.9, 36.91; 138/141, 153
See application file for complete search history.

(56) References Cited

U.S. PATENT DOCUMENTS

| | | | | |
|---|---|---|---|---|
| 2,887,728 A | * | 5/1959 | Usab | 264/260 |
| 3,002,534 A | | 10/1961 | Noland | 138/141 |
| 3,893,488 A | * | 7/1975 | Rogers et al. | 138/141 |
| 3,966,870 A | | 6/1976 | Vecchiotti | 264/255 |
| 4,018,250 A | | 4/1977 | Waters | 138/140 |
| 4,443,507 A | * | 4/1984 | Yamada et al. | 428/114 |
| 5,755,266 A | | 5/1998 | Aanonsen et al. | 138/174 |
| 6,604,550 B2 | * | 8/2003 | Quigley et al. | 138/125 |

FOREIGN PATENT DOCUMENTS

| | | |
|---|---|---|
| DE | 2016121 | 10/1970 |
| EP | 0 360 758 | 3/1990 |
| EP | 0360758 | 3/1990 |
| FR | 2 165 780 | 8/1973 |
| GB | 1167137 | 10/1969 |
| GB | 1 301 581 | 12/1972 |
| GB | 1301581 | 12/1972 |
| GB | 1 482 495 | 8/1977 |
| JP | 48-29787 | 9/1973 |
| JP | 61-24433 | 2/1986 |
| JP | 2-121832 | 5/1990 |
| JP | 8-174703 | 7/1996 |
| JP | 10-128866 | 5/1998 |
| JP | 2004-330559 | 11/2004 |
| SU | 1740848 | 6/1992 |
| WO | WO9100466 | 1/1991 |

OTHER PUBLICATIONS

International Search Report for International App. No. PCT/EP2005/011500; 3 pages.
Notification of Reasons for Rejection (dated Feb. 1, 2011) issued in connection with corresponding Japanese Patent Application No. 2007-543715, with English translation.

* cited by examiner

*Primary Examiner* — Walter B Aughenbaugh
(74) *Attorney, Agent, or Firm* — Kusner & Jaffe

(57) ABSTRACT

A plastic hollow body, in particular plastic pipe, the wall of which is constructed from cylindrical layers bonded to one another, wherein at least one layer is a layer made of a thermosetting material produced in the centrifugal process and the plastic hollow body includes multiple layers of thermosetting material and multiple layers of thermoplastic material.

24 Claims, No Drawings

PLASTIC HOLLOW BODY, IN PARTICULAR PLASTIC PIPE

The invention relates to a plastic hollow body, in particular a plastic pipe.

Plastic pipes are known in diverse embodiments. They serve for conducting liquids and gases, for example. But they may also fulfil physical construction tasks or may be used for passing cables or such like through them.

Pipelines made of conventional polymeric materials have large wall thicknesses relative to standardised nominal diameters. The design of the wall thickness is undertaken, inter alia, taking account of the properties of the material, the respective operating pressure, the operating temperature, the installation conditions, the security against deformation, the expected operating life etc. Large pipe-wall thicknesses have disadvantages with respect to the flow capacity, the weight of the pipe and the material costs. The rate of production of the pipes is also limited, inter alia, by the wall thickness.

Plastic pipes with a pipe wall consisting of cylindrical layers bonded to one another are known, for example, in the form of sewage pipes from EP 0 360 758 B1. All the layers of the pipe contain polyester resin—that is to say, a thermosetting material (Duromer). Whereas the inner layer consists exclusively of a cured polyester resin, the outer layer of the pipe is constituted by a mixture of a cured polyester resin and a filler, for example quartz sand. The layers between the inner and outer layers contain, in addition to polyester resin, varying proportions of fillers and/or glass fibres.

The known pipe is produced in the centrifugal moulding process, which is likewise described in EP 0 360 758 B1. Reference is made thereto within the scope of this application.

The essential features of this process are: the basic materials—namely the curable polyester resin, fillers and glass fibres—are centrifuged via a so-called feeder into a rotating die in varying proportions by mass for the purpose of forming the individual layers. As a result of curing of the resin, the pipe is subsequently given its stability.

In this process, pipes (pipe inserts) can be produced having lengths of 6 m and more. The diameter of the pipe may be small (for example, 10 cm or 30 cm), but it may also amount to a few meters.

The number and composition of the individual layers may depend, inter alia, on the size of the pipe and on the use thereof. The state of the art delineates in exemplary manner the differences between a 'pressure pipe', through which a fluid is conveyed under pressure, and a 'pressureless pipe', for example the aforementioned sewage pipe.

In most applications, the pipes are laid below ground and are subject to various mechanical stresses. This makes it necessary to give the intrinsically stiff pipe a certain flexibility, in order, for example, to avoid destruction in the event of impact stress.

In the state of the art these criteria are taken into account by individual layers of the pipe exhibiting, in addition to the polyester resin, varying further components. According to EP 0 360 758 B1, individual layers consist of polyester resin, others consist of polyester resin and glass fibres, yet others consist of polyester resin, glass fibres and filler. By varying the rotation of the die in the course of production, it is possible for the individual layers to be compacted individually prior to the final curing.

In addition, plastic pressure hoses, for example, are known. The synthetic material is polyester, for example. For the purpose of strengthening, aramide woven fabrics may have been incorporated by way of reinforcement.

Polyolefin pipes with reinforcing fibres consisting of aramide, or with a strengthening consisting of steel wire, also pertain to the state of the art.

The objective of the invention is to make available a plastic pipe of the described type that exhibits an advantageous ductility with high material strength, security against deformation, and long-term strength, so that it can be employed for diverse applications.

Plastic pipes are known in the state of the art that consist of a thermoplastic material (Plastomer). In this connection, the term 'plastomer' stands for non-crosslinked, and therefore plastic or plasticisable, thermoplastics. Hence such thermoplastic materials differ from the aforementioned 'duromers' (thermosetting materials), which is a generic term for hard thermosetting plastics that are crosslinked in close-meshed manner. However, such pipes consisting of thermoplastic synthetic materials—for example, polyvinyl chloride, polypropylene or polyethylene—exhibit only a relatively low strength and cannot be economically employed in particular for relatively large pipes such as are used within the scope of communal water supply and effluent disposal. The necessary large wall thickness is also disadvantageous.

In contrast, in its most general embodiment the invention provides a hollow body of synthetic material, in particular a plastic pipe, the wall of which is constructed from cylindrical layers bonded (linked) to one another, wherein at least one layer is made of a thermosetting material and at least one further layer is made of a thermoplastic material.

A plastic pipe according to the invention may accordingly be designated as a composite pipe in which thermosetting layers alternate with thermoplastic layers.

In this way, the advantageous properties of thermosetting synthetic materials can be combined in synergistic manner with the advantageous properties of thermoplastic synthetic materials.

A curable synthetic resin—for example, a curable polyester resin—may be used by way of thermosetting material for the purpose of constructing the appropriate layer(s).

The thermoplastic material may be a thermoplastic from the following group: polyethylene (PE), polypropylene (PP), polyvinyl chloride (PVC), polystyrene (PS), polyphenyl oxide (PPO), polyphenyl sulfide (PPS), polyphenylene sulfone (PSO, PES), polyimide (PI), polyamide (PA), polyoxymethylene (POM), polybutylene (PB), polyethylene terephthalate (PETP).

According to one embodiment, the plastic pipe—like a conventional centrifuged plastic pipe based on polyester resin—is formed with a plurality of layers, for example 3 to 20 layers, in which case layers made of a thermosetting material are present, alternating regularly or irregularly between layers made of a thermoplastic material—or vice versa. The thickness of each layer may amount to between 0.1 mm and 50 mm; it may be limited to $\leq 10$ mm or $\leq 2$ mm.

Advantages arise if the inner and outer layers of the pipe are bonded onto a thermoplastic material. The outer layer of thermoplastic material offers good protection against impact stress; the inner layer of thermoplastic material minimises the abrasion and is also generally recognised as safe for drinking-water that is transported through the pipe.

The invention is not restricted to employing varying pairings of materials for the purpose of constructing the individual layers. Rather, further optimisations may be carried out at the same time. These comprise, for example, one or more layers exhibiting a reinforcement. Such a reinforcement may be, for example, thermoplastic and highly stretched tapes. These tapes may have been coated with a coupling agent, in order to optimise their bonding to the surrounding synthetic material. The tapes may be flat tapes or profiled tapes. Alternatively or cumulatively, it is possible for fibres to be employed by way of reinforcement. Such fibres may be cut fibres. They may be introduced in randomly distributed or ordered manner and may be distributed in the synthetic material of the respective layer. What is essential is that the fibre material or tape material bonds to the surrounding synthetic material.

The tensile strength (at 23° C.) of the reinforcing material, measured in accordance with ISO 527, should amount to >250 MPa. The modulus of elasticity of the reinforcement should be at least 1.5 times as great as that of the reinforced layer, most preferably at least $\geqq 5$ or $\geqq 10$ times greater.

The reinforcement may also be helical, reticular or latticed, sieve-like or strip-like. The reinforcing material may be woven or braided. It may also consist, whether flat or in the form of a profiled part, of superimposed bonded strips or tapes. A preshaped reinforcing body may be placed onto an already formed layer of the pipe or may be impressed into said layer. Conversely, it is possible, for example, to start from a reticular reinforcing body, for example in cylinder form, and to 'impregnate' said body subsequently with the desired synthetic material, the openings or free spaces in the reinforcement or between the reinforcing parts being filled out at least partially by the synthetic material. According to an important embodiment of the invention, at least one of the thermosetting layers is reinforced, or the reinforcement extends between two thermosetting layers.

In this case also, thermoplastic reinforcing materials—made of highly stretched polyethylene, for example—are again suitable. Similarly suitable are, for example, polypropylene, polyamide or other materials named in Claim 4. The reinforcement or reinforcing layer may also consist of several reinforcing elements—for example, several grids—and may serve for forming several layers of the plastic pipe. In order to obtain a good bonding of the reinforcement with the surrounding synthetic material, openings within the reinforcement or spacings between adjacent reinforcing parts should be chosen to be so large that the appropriate synthetic material in viscous form is able to penetrate and totally enclose the reinforcement. But the 'lattice spacing' should also be chosen so that the material of the pipe wall withstands the maximum internal pressure during the application.

As regarded from the outside to the inside, the following possibilities for the layered structure arise, for example, with layers that contain a thermosetting material (Duromer) being designated below by D, whereas layers that contain a thermoplastic material (Plastomer) are labelled below by P. 'R' signifies reinforcement. The reinforcement may extend entirely or partially within the internally or externally adjacent layer.
1st Example: P-D-D-R-D-P-D-P-P-D
2nd Example: P-D-P-R-D-P-D-P
3rd Example: P-D-D-P-D-P
4th Example: P-P-D-R-P-D-P-D.
5th Example: P-D-D-D-P-D-D-P The individual layers may be bonded to one another by frictional connection or by form fit. Such a bond may be readily obtained, for example, between adjacent D-layers by these D-layers being applied in succession in the centrifugal process, so that in the course of the subsequent curing of the thermosetting synthetic material a form fit of adjacent layers occurs. The technology of the centrifugal process is known (e.g. EP 0 360 758 B1). Reference is made thereto.

A frictional connection between layers that contain varying synthetic materials may also be obtained by applying a coupling agent between the two layers. This applies, in particular, to the bonding of a D-layer with a P-layer, but also to the bonding of P-layers with one another. This is true analogously for R-layers, as already explained above. Such coupling agents may, for example, be adhesive films or so-called fusible films. But chemical coupling agents—for example, polymerisable polyesters or rubber derivatives—may also be employed as coupling agents. These may, for example, be applied in the form of a sticky powder onto the surface of a layer before the next layer is applied. By virtue of the evolution of heat in the course of the curing of thermosetting synthetic materials it is possible for the adhesive effect of the coupling agent to be optimised. Maleic anhydride, which advantageously bonds D-layers and P-layers or R-layers, also serves by way of coupling agent.

The bonding of adjacent layers may also be effected by thermal surface treatment (heating) or by high-energy radiation. Thus the bonding substance may, for example, consist of an LLDPE (linear low-density polyethylene) in a mixture with a PP (polypropylene). In the course of heating, the LLDPE creates, for example, a heat seal with an adjacent PE (polyethylene) layer, and the PP portions of the substance bring about a good bonding with a further adjacent PP layer.

Proceeding from the aforementioned examples, layers that contain the same basic synthetic material may be constructed variably with regard to their further constituents. Thus at least one layer made of a thermosetting material may contain at least one of the following constituents: quartz sand, filler based on $SiO_2$, MgO, CaO, $Al_2O_3$, $MgCO_3$, $CaCO_3$, $Al(OH)_3$, $CaSO_4$, $BaSO_4$, talc, kaolin or mixtures thereof, glass fibres. This will be illustrated further on the basis of the aforementioned first example, which is now represented in exemplary manner as follows:

$$P_1\text{-}D_1\text{-}D_2\text{-}R\text{-}D_3\text{-}P_1\text{-}D_3\text{-}P_1\text{-}P_2\text{-}D_4 \qquad \text{Example 1a}$$

with:
$D_1$: layer consisting of one part by weight of cured polyester resin and three parts by weight of quartz sand.
$D_2$: layer consisting of one part by weight of cured polyester resin and two parts by weight of calcium-carbonate filler with a grain size <0.3 mm.
R: reinforcement consisting of a highly stretched PE tape with cylindrical, latticed design, coated with a random terpolymer with acrylic ester and maleic anhydride.
$D_3$: layer consisting of one part by weight of cured polyester resin and 0.3 parts by weight of glass fibres with a length <60 mm.
$P_1$: layer consisting of polypropylene.
$P_2$: layer consisting of polyphenyl sulfide.
$D_4$: layer consisting of cured polyester resin, the polyester resin of layer $D_4$ differing from the polyester resins of the other D-layers as follows:

The modulus of elasticity (determined in accordance with ISO 527) of layer $D_4$ amounts to 200 MPa, whereas the modulus of elasticity of the remaining D-layers amounts to 2500 MPa. The elongation at break (according to ISO 527, ISO 178) amounts in the case of the $D_4$-layer to about 50%; in the case of the remaining D-layers, to only about 5%. In Example 1a a further P-layer ($P_1$) may advantageously follow on the inside.

The thermosetting wall layers are responsible for the load-bearing capacity of the pipe (the stiffness) and accept the loads that act on the pipe from outside. Above all, therefore, outer layers of thermosetting material are important. A reinforcement of the stated type in a neutral layer or in the inner layers may distinctly increase the internal compressive strength. The internal pressure may amount to 20 bar and more. 'Inner' and 'outer' layers in this connection signify one side and the other side of the middle (neutral layer) of the wall thickness of the pipe.

The thermoplastic wall layers, particularly if they take the form of an outer and/or inner covering layer, offer protection with respect to mechanical attacks. They exhibit a favourable impact resistance and are abrasion-resistant. The thermoplastic materials are advantageous, in particular, by way of inner layer, on account of their drinking-water suitability. But they are also resistant to chemicals, UV-resistant, light-resistant and temperature-resistant.

Whereas the D-layers are applied in accordance with the centrifugal process described in the introduction, the P-layers may be integrated in varying ways. The formation of the R-layers has already been described.

In a 1st embodiment, the thermoplastic layer of synthetic material is constituted by a hose which is shrunk onto a previously created thermosetting layer with the aid of a coupling agent.

In a 2nd embodiment it is likewise assumed that at least one layer has already been created in the centrifugal process by using a thermosetting synthetic material. This layer may still be 'soft'. An extruded, prefolded pipe of a thermoplastic synthetic material is subsequently introduced into the die. Subsequently the pipe is allowed to 'extend' and thereby reassumes its cylindrical shape which is dimensioned so that the external surface bears against the internal surface of the previously formed thermosetting layer. If the outer layer is still 'soft' (not cured), the bond is particularly intense. Also in this embodiment the bond between the D-layer and the P-layer may, in turn, be assisted with the aid of a coupling agent. A next D-layer may again be applied in the centrifugal process.

In a 3rd embodiment, the thermoplastic synthetic material is sprayed onto a previously formed layer. The application by spraying may be effected both from outside and from inside, in order in this way to form an outer or inner further layer.

In a 4th embodiment, the thermoplastic synthetic material is injected into an annular space between a previously formed thermosetting layer and a template which is spaced therefrom. The template is subsequently withdrawn.

In particular for the purpose of forming a thermoplastic peripheral layer (covering layer), a 5th embodiment makes provision to shrink or wind a thermoplastic film onto an existing layer. In this connection, the winding of a still plastic film or sheet onto the existing layer may be effected directly from the extruder. Similarly, a thermoplastic cover layer may be directly extruded in tubular manner onto a pipe body.

A 6th variant makes provision to apply the thermoplastic layer by 'sintering'. To this end, the thermoplastic material is applied in the form of pulverulent material and is subsequently fused under the influence of temperature.

It also lies within the scope of the invention to supplement the layers that contain a thermoplastic synthetic material with fillers or other components. These 'other components' include, for example, glass fibres, filaments or other reinforcing materials. Similarly, the thermoplastic layers, particularly an outer covering layer, may be foamed, so that a thermal insulating layer arises at the same time.

The surface of one of two adjacent layers may be profiled, for example burled, as a result of which the adhesion/anchoring is favoured.

The 'composite pipes' that have been described exhibit a high long-term internal compressive strength, specifically also in the case of diminished wall thickness, in comparison with plastic pipes according to the state of the art. To be emphasised, furthermore, are the advantageous ductile properties of such a pipe body with, at the same time, sufficient radial and axial stiffness; in addition, the imperviousness to diffusion, the fracture toughness and the resistance to chemical substances. The wall thicknesses of the layers are calculated and adapted in accordance with the respective pipe requirements. This also applies to the type, ply-number and thickness of any reinforcement. Thus, for example, the ductility of the pipe as a whole can be changed by means of varying mesh spacings of a latticed reinforcement.

The reinforcement may, if it exhibits a cylindrical shape with openings, that is, if it has a reticular cladding structure, be introduced in a manner analogous to that for the 2nd embodiment (as mentioned above). After the folded cylinder has opened, the reinforcement is able to penetrate at least partially into the still deformable layer of thermosetting material.

The invention also creates the possibility of providing further functional intermediate layers, such as, for example, barrier layers in relation to oxygen, water vapour etc.

The invention claimed is:

1. Plastic hollow body having a wall which is constructed from cylindrical layers that are each bonded to one another by a frictional connection, said frictional connection formed by a coupling agent disposed between each of said cylindrical layers, said cylindrical layers comprised of multiple layers of a thermosetting material and multiple layers of a thermoplastic material,
   wherein one or more of said layers of said they material are disposed between layers of said thermoplastic material,
   wherein the number of layers of said thermosetting material that are disposed between layers of said thermoplastic material varies throughout said plastic hollow body, and
   wherein at least one of said layers of said thermosetting material is produced in a centrifugal process.

2. Plastic hollow body according to claim 1, wherein the thermosetting material is a cured synthetic resin.

3. Plastic hollow body according to claim 1, wherein the thermosetting material is a cured polyester resin.

4. Plastic hollow body according to claim 1, wherein the thermoplastic material is a thermoplastic from the following group: polyolefin, polyethylene, polypropylene, polyvinyl chloride, polystyrene, polyphenyl oxide, polyphenyl sulfide, polyphenylene sulfone, polyimide, polyamide, polyoxymethylene, polybutylene, polyethylene terephthalate.

5. Plastic hollow body according to claim 1, wherein at least one layer contains a reinforcement.

6. Plastic hollow body according to claim 1, wherein at least one layer made of a thermosetting material contains a reinforcement.

7. Plastic hollow body according to claim 1, wherein at least one layer is designed in reticular or latticed manner, and openings in a net or lattice of said layer are filled out at least partially by a synthetic material.

8. Plastic hollow body according to claim 1, wherein at least one of the layers made of the thermosetting material contains at least one of the following further constituents: quartz sand, filler based on $SiO_2$, $MgO$, $CaO$, $Al_2O_3$, $MgCO_3$, $CaCO_3$, $Al(OH)_3$, $CaSO_4$, $BaSO_4$, talc, kaolin, glass fibres or mixtures thereof.

9. Plastic hollow body according to claim 1, the outer covering layer of which is made of a thermoplastic material.

10. Plastic hollow body according to claim 1, the inner covering layer of which is made of a thermoplastic material.

11. Plastic hollow body according to claim 1, wherein the coupling agent is a fusible film.

12. Plastic hollow body according to claim 1, wherein the number of layers of said thermoplastic material that are disposed between layers of said thermosetting material varies throughout said plastic hollow body.

13. Plastic hollow body having a wall which is constructed from cylindrical layers that are each bonded to one another by a frictional connection, said frictional connection formed by a coupling agent disposed between each of said cylindrical layers, said cylindrical layers comprised of multiple layers of thermosetting material and multiple layers of a thermoplastic material,
- wherein one or more of said layers of said thermoplastic material are disposed between layers of said thermosetting material,
- wherein the number of layers of said thermoplastic material that are disposed between layers of said thermosetting material varies throughout said plastic hollow body, and
- wherein at least one of said layers of said thermosetting material is produced in a centrifugal process.

14. Plastic hollow body according to claim 13, wherein the thermosetting material is a cured synthetic resin.

15. Plastic hollow body according to claim 13, wherein the thermosetting material is a cured polyester resin.

16. Plastic hollow body according to claim 13, wherein the thermoplastic material is a thermoplastic from the following group: polyolefin, polyethylene, polypropylene, polyvinyl chloride, polystyrene, polyphenyl oxide, polyphenyl sulfide, polyphenylene sulfone, polyimide, polyamide, polyoxymethylene, polybutylene, polyethylene terephthalate.

17. Plastic hollow body according to claim 13, wherein at least one layer contains a reinforcement.

18. Plastic hollow body according to claim 13, wherein at least one layer made of a thermosetting material contains a reinforcement.

19. Plastic hollow body according to claim 13, wherein at least one layer is designed in reticular or latticed manner, and openings in a net or lattice of said layer are filled out at least partially by a synthetic material.

20. Plastic hollow body according to claim 13, wherein at least one of the layers made of the thermosetting material contains at least one of the following further constituents: quartz sand, filler based on $SiO_2$, $MgO$, $CaO$, $Al_2O_3$, $MgCO_3$, $CaCO_3$, $Al(OH)_3$, $CaSO_4$, $BaSO_4$, talc, kaolin, glass fibres or mixtures thereof.

21. Plastic hollow body according to claim 13, the outer covering layer of which is made of a thermoplastic material.

22. Plastic hollow body according to claim 13, the inner covering layer of which is made of a thermoplastic material.

23. Plastic hollow body according to claim 13, wherein the coupling agent is a fusible film.

24. Plastic hollow body according to claim 13, wherein the number of layers of said thermosetting material that are disposed between layers of said thermoplastic material varies throughout said plastic hollow body.

* * * * *